UNITED STATES PATENT OFFICE.

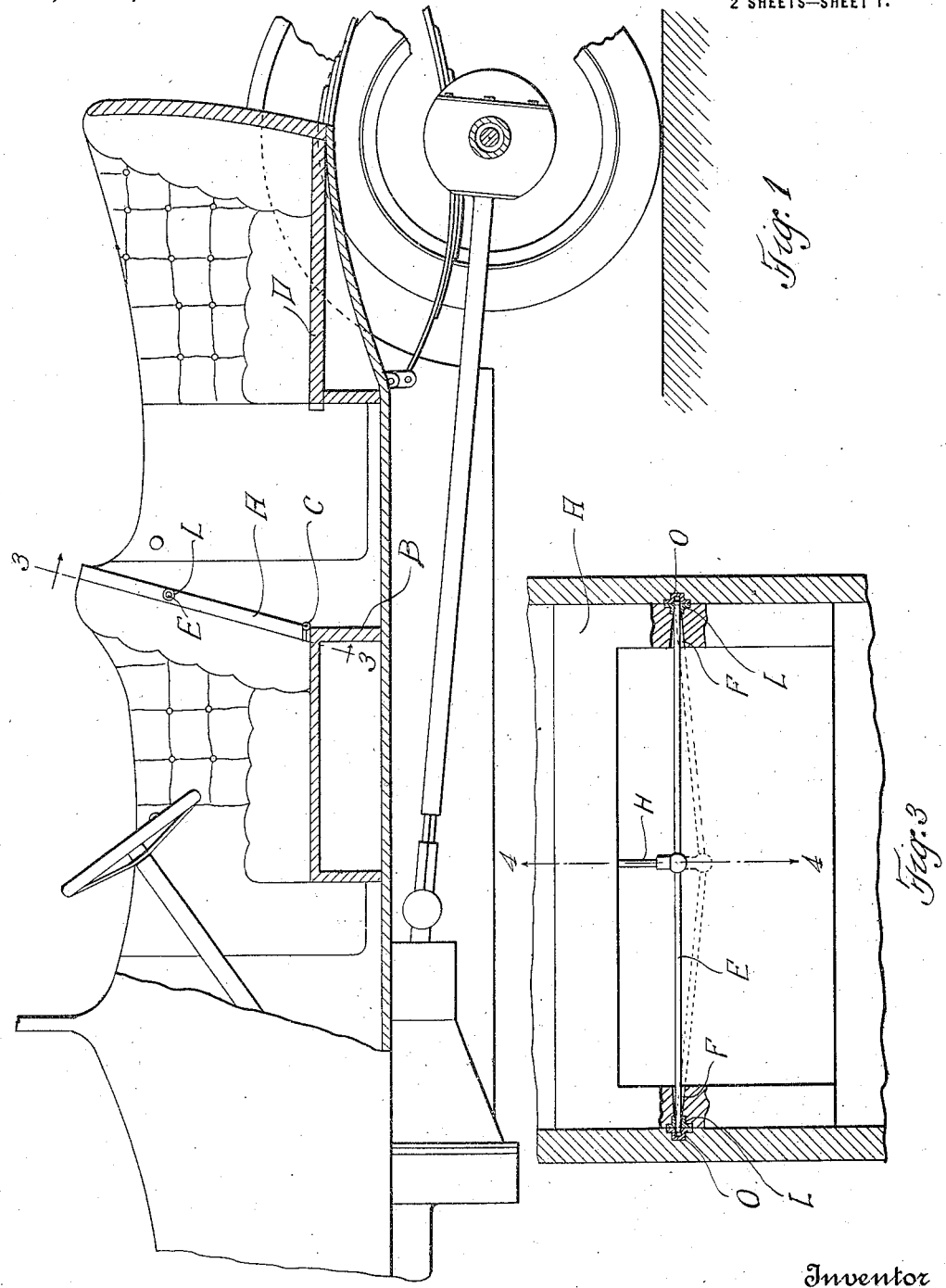

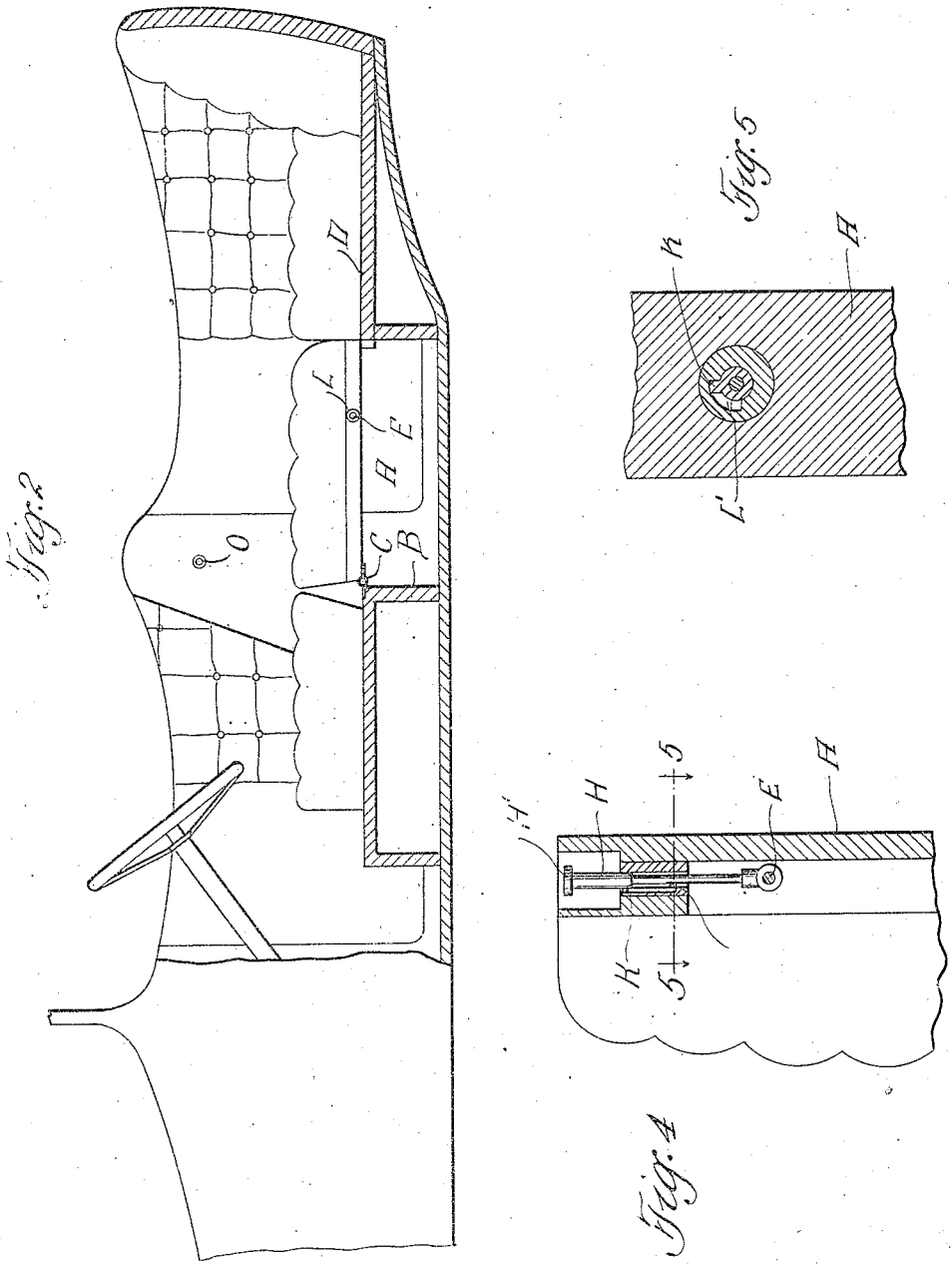

JAMES WICKLIFFE DANIEL, OF TEXICO, NEW MEXICO.

ADJUSTABLE AUTOMOBILE-SEAT.

1,211,295.  Specification of Letters Patent.  Patented Jan. 2, 1917.

Application filed May 3, 1916. Serial No. 95,187.

*To all whom it may concern:*

Be it known that I, JAMES W. DANIEL, a citizen of the United States, residing at Texico, in the county of Curry and State of New Mexico, have invented certain new and useful Improvements in Adjustable Automobile-Seats; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in adjustable automobile seats, the object in view being to produce a simple and efficient device of this nature so arranged that, when desired, the front seat may be turned down to a horizontal position, forming a bed.

The invention consists further in connection with a folding back of a seat of means for holding the seat in an upright position.

The invention comprises various details of construction, combinations and arrangements of parts which will be hereinafter fully described, shown in the accompanying drawings and then specifically defined in the appended claims.

I illustrate my invention in the accompanying drawings, in which:—

Figure 1 is a central vertical sectional view through an automobile showing the front seat held in an upright position. Fig. 2 is a similar view showing the front seat turned down to a horizontal position to form a bed. Fig. 3 is a sectional view on line 3—3 of Fig. 1. Fig. 4 is a sectional view taken on line 4—4 of Fig. 3. Fig. 5 is a sectional view taken on line 5—5 of Fig. 4.

Reference now being had to the details of the drawings by letter, A designates the back of the front seat B of an automobile, being hinged thereto through the medium of the hinge C, and D designates the rear seat of the automobile. Said back is provided with a resilient rod E, mounted horizontally in the tapering apertures F in the opposite ends of the back, and H is a push rod which is mounted in an aperture in the top of the back and is connected centrally to said rod E. Said push rod H has a lug K projecting therefrom and which is adapted to turn into an offset or recess L formed in the opening in the back in which said rod H is positioned and is provided for the purpose of holding the rod E in its sprung position, shown in dotted lines in Fig. 3 of the drawings, and in which position its ends will be held out of the sockets O formed in the sides of the car, the said ends of the wire or rod E having a play in the sockets L which are countersunken in the opposite edges of the front seat, as shown clearly in Fig. 3 of the drawings.

The upper end of the rod H, it will be noted upon reference to Fig. 4 of the drawings, has a head H′, the upper surface of which is sunken below the top of the seat so as not to prevent an unsightly appearance.

When the seat is adjusted in its normal upright position, the rod E will be in engagement with the sockets O, thus holding the seat in such position. When it is desired to throw the seat to a horizontal position, the operator, by pushing down upon the rod H, may cause the rod E to spring so that its ends will be withdrawn from the sockets O, thus allowing the seat to swing down so that its free swinging edge will rest upon the rear seat, as shown in Fig. 2, and, when the cushions are placed upon the seats, a bed will be formed. In order to hold the ends of the bar E from striking against the sides of the rack, a partial axial rotary movement is imparted to the push rod H in order to bring the lug K thereon underneath the shoulders in the recess L′, as shown in Fig. 5 of the drawings.

By the provision of an apparatus embodying the features of my invention, it will be noted that a simple and efficient mechanism is afforded whereby the back of the front seat of the automobile may be easily and quickly swung down to a horizontal position, forming a bed.

What I claim to be new is:—

1. A convertible back to automobile seats comprising, in combination with a back and seat to which the same is hinged, a horizontally disposed resilient bar mounted in said back, an axially movable push rod mounted in the back of the seat and engaging said resilient bar, a lug upon the push rod adapted to engage a shoulder in the back of the seat forming means for holding the resilient rod in a sprung position with its ends retracted within the back of the seat.

2. A convertible back to automobile seats comprising, in combination with a back and seat to which the same is hinged, and provided with tapering apertures near its opposite sides, socket members countersunken in said apertures and in the side walls of the car, a horizontally disposed resilient rod mounted in said apertures and engaging the sockets in the back, an axially rotatable push rod adapted to bear against and hold the resilient rod in a sprung position, and means for holding the push rod in an operative position.

In testimony whereof I hereunto affix my signature in presence of two witnesses.

JAMES WICKLIFFE DANIEL.

Witnesses:
W. T. ROBERTSON,
W. W. VINYARD.